US010909124B2

(12) United States Patent
Lim et al.

(10) Patent No.: US 10,909,124 B2
(45) Date of Patent: Feb. 2, 2021

(54) PREDICTING INTENT OF A SEARCH FOR A PARTICULAR CONTEXT

(71) Applicant: Google Inc., Mountain View, CA (US)

(72) Inventors: Yew Jin Lim, Saratoga, CA (US); Joseph Linn, Mountain View, CA (US); Yuling Liang, Sunnyvale, CA (US); Carsten Steinebach, El Cerrito, CA (US); Wei Lwun Lu, Sunnyvale, CA (US); Dong Hyun Kim, San Francisco, CA (US); James Kunz, Los Altos, CA (US); Lauren Koepnick, Mountain View, CA (US); Min Yang, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 405 days.

(21) Appl. No.: 15/598,580

(22) Filed: May 18, 2017

(65) Prior Publication Data

US 2018/0336200 A1    Nov. 22, 2018

(51) Int. Cl.
  G06F 16/30       (2019.01)
  G06F 16/2457    (2019.01)
  G06N 20/00       (2019.01)
  G06F 16/335     (2019.01)
  G06F 16/9535   (2019.01)
  G06N 5/04         (2006.01)

(52) U.S. Cl.
  CPC ...... *G06F 16/24578* (2019.01); *G06F 16/335* (2019.01); *G06F 16/9535* (2019.01); *G06N 5/04* (2013.01); *G06N 20/00* (2019.01)

(58) Field of Classification Search
  CPC ........... G06F 16/24578; G06F 16/9535; G06F 16/335
  USPC ....... 707/607, 609, 698, 705, 769, 790, 813, 707/821
  See application file for complete search history.

(56) References Cited

U.S. PATENT DOCUMENTS

| 8,051,076 | B1  | 11/2011 | Garg et al. |
| 9,384,244 | B1* | 7/2016  | Garg ................. G06F 16/90324 |
| 2008/0027961 | A1 | 1/2008 | Arlitt et al. |
| 2009/0177645 | A1 | 7/2009 | Heck |

(Continued)

FOREIGN PATENT DOCUMENTS

| WO | 2014078809 A1 | 5/2014 |
| WO | 20150094397   | 6/2015 |
| WO | 20160190972   | 12/2016 |

OTHER PUBLICATIONS

Belkin, "Helping People Find What They Don't Know," Communications of the ACM vol. 43, No. 8, Aug. 2000, 4 pp.

(Continued)

*Primary Examiner* — Sana A Al-Hashemi
(74) *Attorney, Agent, or Firm* — Middleton Reutlinger

(57) ABSTRACT

A computing system is described that determines, based on user-initiated actions performed by a group of computing devices, an intent of a search using a particular search query received from a computing device. The computing system adjusts, based on the intent, at least a particular portion of search results obtained from the search using the search query by emphasizing information that satisfies the intent. The computing system sends, to the computing device, an indication of the adjusted search results.

20 Claims, 3 Drawing Sheets

(56) References Cited

U.S. PATENT DOCUMENTS

| | | | |
|---|---|---|---|
| 2010/0082582 A1 | 4/2010 | Gao et al. | |
| 2012/0158685 A1 | 6/2012 | White et al. | |
| 2012/0284256 A1 | 11/2012 | Mahajan et al. | |
| 2013/0036117 A1 | 2/2013 | Fisher et al. | |
| 2013/0254329 A1 | 9/2013 | Lin et al. | |
| 2014/0188956 A1 | 7/2014 | Subba et al. | |
| 2014/0330819 A1 | 11/2014 | Raina et al. | |
| 2016/0335355 A1 | 11/2016 | Vandanapu et al. | |
| 2016/0350383 A1 | 12/2016 | Lim et al. | |
| 2016/0381658 A1* | 12/2016 | Ghosh | G06F 9/453 455/458 |
| 2018/0089542 A1* | 3/2018 | Stoop | G06K 9/6878 |
| 2018/0189325 A1* | 7/2018 | Hohwald | G06N 3/0454 |
| 2018/0246974 A1* | 8/2018 | Shukla | G06F 16/9535 |

OTHER PUBLICATIONS

Warshaw, "A New Model for Predicting Behavioral Intentions: An Alternative to Fishbein," Journal of Marketing Research, vol. XVII, May 1980, 21 pp.

Adomavicius et al., "Context-Aware Recommender Systems," Proceedings of the 2008 ACM Conference on Recommender Systems, Oct. 23-25, 2008, Switzerland, 37 pp.

Radwan, "Predicting behavior from actions in the past," 2KnowMySelf, 2014, Retrieved from: http://www.2knowmyself.com/predicting_behavior_from_actions_in_the_past 3 pp.

Belkin, "Intelligent Information Retrieval: Whose Intelligence?" Proceedings of the Fifth International Symposium for Information (ISI '96), 1996, 6 pp.

Levy, "Siri's Inventors are Building a Radical New AI That Does Anything You Ask," WIRED, Retrieved from: <http://www.wired.com/2014/08/viv/> Aug. 12, 2014, 20 pp.

Viv Labs, "Viv: The Global Brain," Viv Labs, Retrieved from: <http://viv.ai/> 2015, 4 pp.

White et al., "Predicting User Interests from Contextual Information," Proceedings of the 32nd International ACM SIGIR conference on Research and Development in Information Retrieval, Jul. 19-23, 2009, Boston, MA, 8 pp.

White et al., "Predicting Short-Term Interests Using Activity-Based Search Context," CIKM'10, ACM, Oct. 23-30, 2010, 10 pp.

Hong et al., "Context-aware system for proactive personalized service based on context history," Expert Systems with Applications, vol. 36, No. 4, Dec. 25, 2008, 10 pp.

Lane et al., "Hapori: Context-based Local Search for Mobile Phones using Community Behavioral Modeling and Similarity," Ubicomp 2010, ACM, Sep. 26-29, 2010, 10 pp.

Olivarez-Giles, "'Google Now' Will Suck in Outside App Data," The Wall Street Journal, Jan. 30, 2015, 3 pp.

International Search Report and Written Opinion of PCT Ser. No. PCT/US2018/032791 dated Aug. 7, 2018, 12 pages.

Belkin et al., "Relevance Feedback versus Local Context Analysis as Term Suggestion Devices: Rutgers' TREC-8 Interactive Track Experience," Proceedings of 8th Text Retrieval Conference, Washington D.C., NIST, http://citeseerx.ist.psu.edu/viewdoc/summary?doi=10.1.1.38.8464; 9 pages; 2000.

* cited by examiner

PREDICTING INTENT OF A SEARCH FOR A PARTICULAR CONTEXT

BACKGROUND

A user may turn to a computing device for obtaining information and facts that might assist the user in accomplishing a certain task. Some computing devices require that the user be able to provide sufficient information (e.g., search query terms) for guiding the computing device towards locating the particular information that the user is searching for. If a search query is not narrowly tailored, or if the user does not provide much in the way of additional information beyond the query, a computing device may return too much information; with some of the most interesting or relevant information being difficult for a user to find. The user may experience stress and/or waste valuable time and resources inputting very detailed queries and into a computing device, causing the computing device to execute multiple searches, or sifting through large quantities of search results, to obtain information necessary to accomplish the certain task.

SUMMARY

In general, techniques of this disclosure may enable a computing system to predict an intent of a search query for a particular context of a computing device. Based on contextual information (e.g., locations, user interest, times of day, etc.) of a computing device/user, the system may define a relevant context for a search query, and predict, based on the relevant context, an intent or purpose of a search using the search query in the relevant context. The system may adjust, based on the intent, search results returned from the search so that information for satisfying the intent is emphasized over other information returned from the search. For instance, after a user of a computing device purchases tickets to a particular movie that is out in movie theatres, a user may cause the computing system to execute a search using the name of the particular movie as part of a query. The system may obtain contextual information including an indication that the tickets were already purchased for a future showing of the particular movie. In response, the system may infer (e.g., based on log data indicative of user-initiated actions performed by other computing devices) that the search including the name of the particular movie is for a purpose other than purchasing additional tickets. The system may therefore adjust the search results returned from the search so that movie show times are ranked lower than other information (e.g., reviews, memorabilia, trivia, etc.) about the particular movie. In this way, by automatically adjusting the search results to emphasize the information a user is more likely to be searching for, in a current context, the system may allow users to experience less stress and/or not waste valuable time and resources hunting for the information in and amongst search results.

Throughout the disclosure, examples are described where a computing device and/or a computing system analyzes information (e.g., context, locations, speeds, search queries, etc.) associated with a computing device and a user of a computing device, only if the computing device receives permission from the user of the computing device to analyze the information. For example, in situations discussed below, before a computing device or computing system can collect or may make use of information associated with a user, the user may be provided with an opportunity to provide input to control whether programs or features of the computing device and/or computing system can collect and make use of user information (e.g., information about a user's current location, current speed, etc.), or to dictate whether and/or how to the device and/or system may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and computing system.

In one example, the disclosure is directed to a method that includes determining, by a computing system, based on user-initiated actions performed by a group of computing devices and contextual information of a computing device, an intent of a search using a particular search query received from the computing device, adjusting, based on the intent, at least a particular portion of search results obtained from the search using the search query by emphasizing information that satisfies the intent, and sending, by the computing system, to the computing device, an indication of the adjusted search results.

In another example, the disclosure is directed to a system that includes means for determining, based on user-initiated actions performed by a group of computing devices and contextual information of a computing device, an intent of a search using a particular search query received from the computing device, means for adjusting, based on the intent, at least a particular portion of search results obtained from the search using the search query by emphasizing information that satisfies the intent, and means for sending, to the computing device, an indication of the adjusted search results.

In another example, the disclosure is directed to a computing system that includes at least one processor and a memory that includes instructions that, when executed, cause the at least one processor to determine, based on user-initiated actions performed by a group of computing devices and contextual information of a computing device, an intent of a search using a particular search query received from the computing device, adjust, based on the intent, at least a particular portion of search results obtained from the search using the search query by emphasizing information that satisfies the intent, and send, to the computing device, an indication of the adjusted search results.

In another example, the disclosure is directed to a computer-readable storage medium including instructions that, when executed, configure one or more processors of a computing system to determine, based on user-initiated actions performed by a group of computing devices and contextual information of a computing device, an intent of a search using a particular search query received from the computing device, adjust, based on the intent, at least a particular portion of search results obtained from the search using the search query by emphasizing information that satisfies the intent, and send, to the computing device, an indication of the adjusted search results.

The details of one or more examples are set forth in the accompanying drawings and the description below. Other features, objects, and advantages of the disclosure will be apparent from the description and drawings, and from the claims.

DETAILED DESCRIPTION

Figure 1:
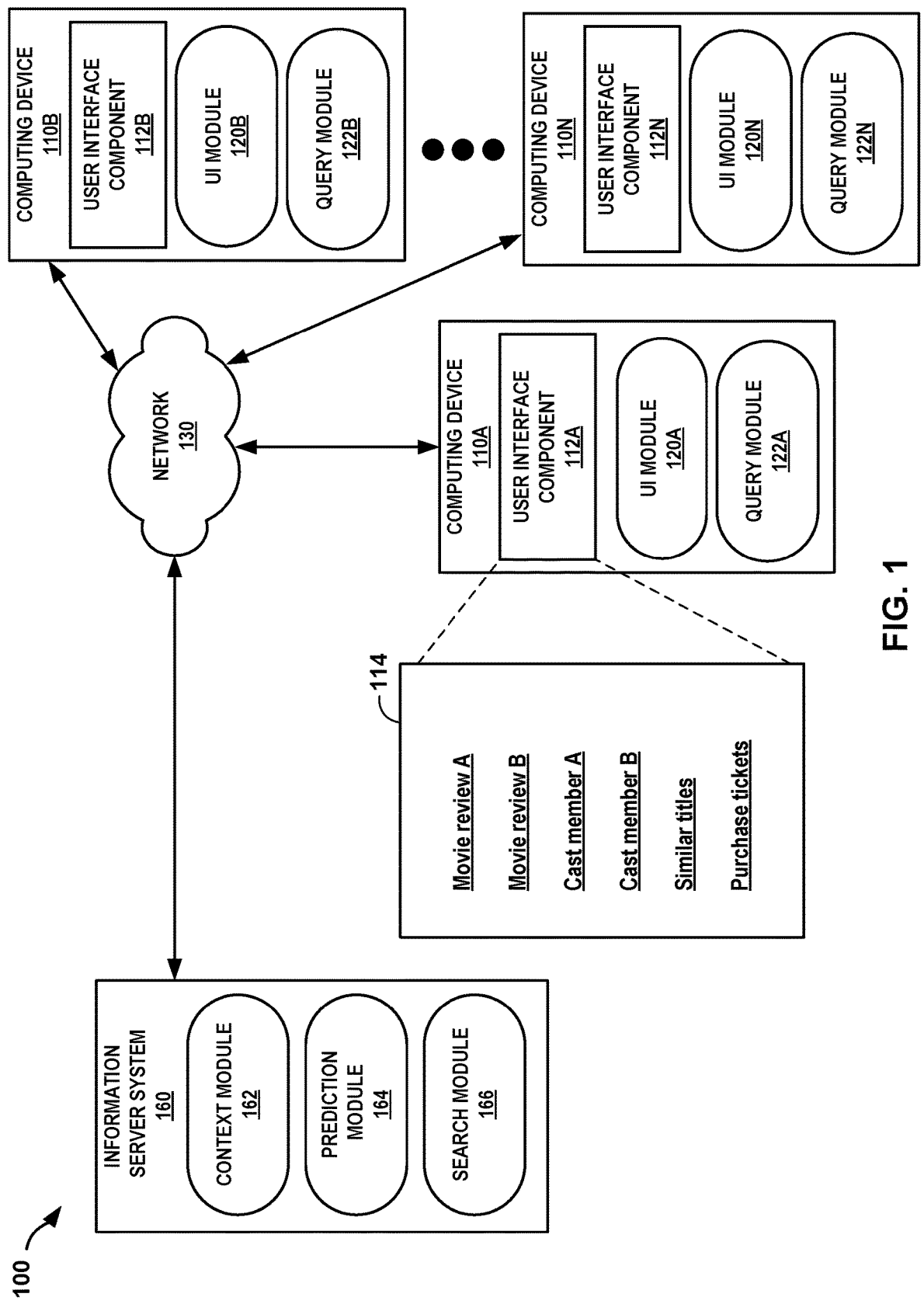
FIG. 1 is a conceptual diagram illustrating an example system for predicting an intent associated with a search query and adjusting search results based on the intent, in accordance with one or more aspects of the present disclosure.

FIG. 1 is a conceptual diagram illustrating an example system for predicting an intent associated with a search query and adjusting search results based on the intent, in accordance with one or more aspects of the present disclosure. System 100 includes information server system ("ISS") 160 in communication, via network 130, with computing devices 110A-110N (collectively, "computing devices 110").

Network 130 represents any public or private communications network, for instance, cellular, Wi-Fi, and/or other types of networks, for transmitting data between computing systems, servers, and computing devices. ISS 160 may exchange data, via network 130, with computing devices 110 to provide a prediction and service that is accessible to computing devices 110 when computing devices 110 are connected to network 130.

Network 130 may include one or more network hubs, network switches, network routers, or any other network equipment, that are operatively inter-coupled thereby providing for the exchange of information between ISS 160 and computing devices 110. Computing devices 110 and ISS 160 may transmit and receive data across network 130 using any suitable communication techniques. Computing devices 110 and ISS 160 may each be operatively coupled to network 130 using respective network links. The links coupling computing devices 110 and ISS 160 to network 130 may be Ethernet or other types of network connections and such connections may be wireless and/or wired connections.

ISS 160 hosts (or at least provides access to) a search service. In the course of providing search services, ISS 160 may communicate with computing device 110 to obtain information needed for completing a task. ISS 160 represents any suitable remote computing system, such as one or more desktop computers, laptop computers, mainframes, servers, cloud computing systems, etc. capable of sending and receiving information both to and from a network, such as network 130. In some examples, ISS 160 represents cloud computing systems that provides access to the search service via a cloud.

Computing devices 110 represent individual mobile or non-mobile computing devices that are configured to access the search service provided via network 130. Computing devices 110 may communicate with ISS 160 via network 130 to access the search service provided by ISS 160. Examples of computing devices 110 include a mobile phone, a tablet computer, a laptop computer, a desktop computer, a server, a mainframe, a set-top box, a television, a wearable device (e.g., a computerized watch, computerized eyewear, computerized gloves, etc.), a home automation device or system (e.g., an intelligent thermostat, a security system, a table-top assistant device), a voice-interface or countertop home assistant device, a personal digital assistants (PDA), a gaming system, a media player, an e-book reader, a mobile television platform, an automobile navigation or infotainment system, or any other type of mobile, non-mobile, wearable, and non-wearable computing device configured to access a search service and receive information via a network, such as network 130.

In the example of FIG. 1, ISS 160 includes context module 162, prediction module 164, and search module 166. Each of computing devices 110 includes a respective user interface device 112A-112N (collectively "UICs 112") and a respective user interface (UI) module 120A-120N (collectively "UI modules 120"). In addition, each of computing devices 110 includes a respective query module 122A-122N (collectively "query modules 122").

Modules 162, 164, 166, 120, and 122 may perform operations described using software, hardware, firmware, or a mixture of hardware, software, and firmware residing in and/or executing at ISS 160 or computing devices 110. ISS 160 and computing devices 110 may execute modules 162, 164, 166, 120, and 122 with multiple processors or multiple devices. ISS 160 and computing devices 110 may execute modules 162, 164, 166, 120, and 122 as virtual machines executing on underlying hardware. Modules 162, 164, 166, 120, and 122 may execute as one or more services of an operating system or computing platform. Modules 162, 164, 166, 120, and 122 may execute as one or more executable programs at an application layer of a computing platform.

Computing devices 110B-110N constitute a group of computing devices from which respective users associated with computing devices 110B-110N may perform searches for information. In some examples, computing device 110A is included in the group with computing devices 110B-110N and a user associated with computing device 110A may also perform searches for information from computing device 110A. In other examples the group of computing devices 110B-110N excludes computing device 110A.

UICs 112 of computing devices 110 may function as respective input and/or output devices for computing devices 110. UICs 112 may be implemented using various technologies. For instance, UICs 112 may function as an input device using presence-sensitive input screens, microphone technologies, infrared sensor technologies, cameras, or other input device technology for use in receiving user input. UICs 112 may function as output device configured to present output to a user using any one or more display devices, speaker technologies, haptic feedback technologies, or other output device technology for use in outputting information to a user.

UI modules 120 may manage user interactions with UICs 112 and other components of computing devices 110 and may interact with ISS 160 to provide search services via UICs 112. UI modules 120 may cause respective UICs 112 to output respective user interfaces as respective user of computing devices 110 views output and/or provides input at UICs 112. For example, as shown in FIG. 1, UI module 120A may send instructions to UIC 112A that cause UIC 112A to display user interface 114 at a display screen of UIC 112A.

In the example of FIG. 1, user interface 114 is a graphical user interface associated with a search service provided by ISS 160 and accessed by computing device 110A. As described in detail below, user interface 114 includes graphical information (e.g., text), which represents adjusted search results that ISS 160 returns from a search using a search query received from computing device 110A. In some examples, User interface 114 may be an audible user interface, a haptic user interface, or a combination graphical/audible/haptic user interface. User interface 114 may present search results in various forms, such as forms such as audible sounds, vibrations, text, graphics, content cards, images, or any other visual, audible, and/or haptic form.

UI modules 120 and UICs 112 may receive one or more indications of input (e.g., voice input, touch input, non-touch or presence-sensitive input, video input, audio input, etc.) from a user as the user interacts with a user interface, at different times and when users and computing devices 110 are at different locations. UI modules 120 and UICs 112 may interpret inputs detected at UICs 112 and may relay information about the inputs detected at UICs 112 to other modules of system 100, including modules 162, 164, 166, and 122.

UI modules 120 may receive information and instructions from one or more associated platforms, operating systems, applications, and/or services executing at computing devices 110 and/or one or more remote computing systems, such as ISS 160. In addition, UI modules 120 may act as intermediaries between the one or more associated platforms, operating systems, applications, and/or services executing at computing devices 110, and various output devices of computing devices 110 (e.g., speakers, LED indicators, audio or haptic output device, etc.) to produce output (e.g., a graphic, a flash of light, a sound, a haptic response, etc.) with computing devices 110. For example, UI module 120A may cause UIC 112A to output user interface 114 based on data UI module 120A receives via network 130 from ISS 160. UI module 120A may receive, as input from ISS 160 information (e.g., audio data, text data, image data, etc.) and instructions for presenting as user interface 114.

Query modules 122 perform search related functions for computing devices 110. Query modules 122 may transmit search queries (e.g., character strings, image data, etc.) via network 130 to ISS 160 and, in response, may obtain results of searches performed by ISS 160 based on the queries. Query modules 122 may receive indications of the search queries from UI modules 120 as users of computing devices 110 provide inputs at UICs 112. Query modules 122 may output search results received from ISS 160 to UI modules 120, for instance, to cause UI modules 120 to present the search results as part of user interfaces that UI modules 120 present at UICs 112.

After receiving explicit consent from users of computing devices 110 to store and make use of personal information, context module 162 is configured to gather contextual information related to computing devices 110 and provides the information to, and makes determinations based on the contextual information for, modules 164 and 166. As one example, context module 162 may define one or more contexts of computing devices 110 and/or a user of computing devices 110.

Context module 162 may encrypt or otherwise treat the information being analyzed and/or stored to remove the actual identity of the user before storing or making use of the personal information. For example, the information may be treated by context module 162 so that any personally-identifiable information is removed when stored or sent across network 130. Context module 162 may only analyze information associated with computing devices 110 and/or users of computing devices 110 if the user affirmatively consents to use or collection of such information. Context module 162 may further provide opportunities for users to withdraw consent and in which case, context module 162 may cease collecting or otherwise retaining the information associated with respective computing devices 110 or the respective users of computing devices 110.

As used throughout the disclosure, the term "contextual information" is used to describe any conceivable information that may be used by a computing system and/or computing device, such as ISS 160 and computing devices 110, to determine one or more environmental or behavioral characteristics associated with computing devices and/or users of computing devices. Location and movement information is only some of the types of contextual information context module 162 may maintain for each of computing devices 110. In addition, contextual information may include user topics of interest (e.g., a user's favorite "things" typically maintained as a user interest graph or some other type of data structure), contact information associated with users (e.g., a user's personal contact information as well as information about a user's friends, co-workers, social media connections, family, etc.), search histories, location histories, long and short term tasks, calendar information, application use histories, purchase histories, favorites, bookmarks, and other information that computing devices 110 and ISS 160 can gather about a user of computing devices 110.

Furthermore, contextual information may include information about the operating state of a computing device. For example, an application that is executed at a given time or in a particular location is an example of information about the operating state of a computing device. Other examples of contextual information based on the operating state of a computing device include, but are not limited to, positions of switches, battery levels, whether a device is plugged into a wall outlet or otherwise operably coupled to another device and/or machine, user authentication information (e.g., which user is currently authenticated-on or is the current user of the device), whether a device is operating in "airplane" mode, in standby mode, in full-power mode, the operational state of radios, communication units, input devices and output devices, etc.

A "context" of a computing device may specify one or more characteristics associated with the computing device and/or the user of the computing device. The context may specify characteristics associated with the physical and/or virtual environment of the user and/or the computing device at various locations and times. As some examples, a context of a computing device may specify: an acoustic fingerprint, a video fingerprint, a location, a movement trajectory, a direction, a speed, a name of an establishment, a street address, a type of place, a building, weather conditions, and traffic conditions, at various locations and times. The context of a computing device may specify a calendar event, a meeting, or other event associated with a location and/or time. The context of a computing device may specify a webpage addresses viewed at a particular time, one or more text entries made in data fields of the webpages at particular times including search or browsing histories, product purchases made at particular times, product wish lists, product registries, and other application usage data associated with various locations and times. The context of the computing device may further specify audio and/or video accessed by or being broadcast in the presence of the computing device at various locations and times, television or cable/satellite broadcasts accessed by or being broadcast in the presence the computing device at various locations and times, and information about other services accessed by the computing device at various locations and times.

Context module 162 may update a context of a computing device based on updated contextual information. For example, context module 162 may determine an initial context of computing device 110A or a user of computing device 110A based on initial contextual information associated with computing device 110A or the user of computing device 110A. As the contextual information changes (e.g., based on sensor information indicative of movement over time), context module 162 may update or determine a new context for computing device 110A. For example, context module 162 may obtain online purchase information associated with computing device 110A and determine, based on the purchase information, that part of a current context of computing device 110A indicates that a user of computing device 110A recently purchased tickets to a particular movie or intends to go see the particular movie. After the user goes to the movie, context module 162 may obtain location history information associated with computing device 110A that indicates the user of computing device 110A was at the location of the movie showing indicated by the previously purchased ticket, at the time it was to be shown. Based on the location information, context module 162 may determine that part of the current context of computing device 110A indicates that the user of computing device 110A went to the particular movie or has already seen the particular movie.

Context module 162 may provide the contextual information and make determinations about the contextual information that context module 162 maintains, on behalf of other modules 164 and 166, as well as computing devices 110. For example, context module 162 may respond to a request from prediction module 164 of ISS 160 for a current context of computing device 110A by outputting, for transmission to prediction module 164, data maintained by context module 162 that specifies the current context of computing device 110A.

Contextual module 162 may maintain contextual histories associated with each of computing devices 110 and determine whether a respective, current context associated with one or more of computing devices 110 matches a previous context found in a respective contextual history. For example, context module 162 may maintain, as part of a contextual history associated with computing device 110A, a location history that tracks where computing device 110A was located at a particular day or time.

Search module 166 may conduct a search (e.g., an internet search) for information (e.g., weather or traffic conditions, news, stock prices, sports scores, user schedules, transportation schedules, retail prices, etc.) related to a search query from amongst a variety of information sources (e.g., either stored locally or remote to ISS 160). After executing a search, search module 166 may output the information returned from the search (e.g., search results, links to search results, etc.) to a component of ISS 160 (e.g., prediction module 164) or computing devices 110. Search module 166 may execute a search for information determined to be relevant to a search query generated by query modules 122 and may supplement or modify the search query being searched based on one or more contexts determined by context module 162.

Search module 166 may maintain one or more search histories of users of computing devices 110. The search histories maintained by search modules 166 may be part of, or separate from, the contextual histories maintained by context module 162. The search histories generated by search modules 166 may be sortable, and searchable, such that at a given time, search module 166 may analyze the search histories of one or more of computing devices 110 to determine what types of queries that users of computing devices 110 have been searching for. Search module 166 may provide module 162 and 164 with access to the search histories and/or may analyze the search histories and output information from the search histories on behalf of modules 162 and 164.

Prediction module 164 is configured to learn and predict an intent of a search using a search query for a particular context of a computing device. Prediction module 164 may be trained based on user-initiated actions (e.g., inferred from log data) performed by other computing devices in a variety of contexts. In other words, prediction module 164 is configured to learn and predict a purpose for a search using a particular search query given a particular context and given past searches or past actions executed by other computing devices in the particular context, as well as other contexts.

Prediction module 164 may determine the intent of a search query by defining a narrow context of a computing device (e.g., indicating a few specific characteristics of a computing device/user) and which is more likely to be related to a search query than, say, a broad context (e.g., indicating a many specific characteristics of a computing device/user) received from context module 162. That is a broad context of a computing device may include a lot of information, however, for determining an intent of a search query, prediction module 164 may only really need to utilize a subset of the information in the broad context. In other words, prediction module may filter out all the unnecessary information from a context of a computing device to define a narrow context so a true intent of the search query can be inferred. Prediction module 164 may therefore determine an intent of a search query for a narrow context, as opposed to a broad context of a computing device.

Prediction module 164 may execute a machine-learning model (e.g., a deep-learning model) that receives as inputs: a search query (or portion of a search query) and a current context received from context module 162. The machine-learning model may generate as output, an indication (such as a label or other identifier) of an intent of a search using the search query for the current context.

The intents determined by prediction module 164 may be selected from a group of predefined intents. Some examples of predefined intents include transportation or travel related intents (e.g., ride sharing, flight status, ticket purchase, schedules, and other transportation related intents) and entertainment related intents (e.g., movie review, show times, ticket purchase, cast member biography, album or song review, artist biography, artist tour dates, and other entertainment related intents).

In some cases, prediction module 164 may generate as output, a score associated with an intent. The score of an intent may indicate a degree of confidence (e.g., a probability or other degree of likelihood) that the purpose of executing a search using the search query in a current context is to obtain information that satisfies the intent. Prediction module 164 may adjust, or refrain from adjusting, search results depending on whether the score of the intent satisfies a minimum scoring threshold. For example, if a score of an intent is less than the minimum scoring threshold (e.g., 50%), prediction module 164 may refrain from adjusting search results based on an intent and if the score is greater than or equal to the minimum scoring threshold, prediction module may adjust the search results based on the intent.

The machine-learning model of prediction module 164 may be trained on user interaction data (e.g., log data) indicative of user inputs received by computing devices 110 for various contexts. Said differently, the machine-learning model of prediction module 164 may be trained on observable actions executed by computing devices 110 for a variety of contexts. Prediction module 164 may determine which user inputs or user-initiated actions having been observed in similar contexts, that are also unique to the current context or not necessarily observed with relative frequency in other, different contexts. Based on the user inputs or user-initiated actions that are unique to the current context, prediction module 164 may infer that a user of a computing device, in the current context, may perform similar actions. Prediction module 164 may determine that an intent of a search using a search query is to assist the user in performing one or more of the similar actions.

One example of user interaction data (e.g., log data) includes application usage data. Application usage data indicates whether an application is opened, closed, or installed given a particular context. Prediction module 164 may learn and predict application usage for various contexts. For example, prediction module 164 may develop a rule that on Saturday nights when at home locations, when it is raining outside, some users typically interact with a movie review application whereas on Saturday nights when at home locations, when it is not raining outside, some users typically interact with movie ticket purchasing applications.

One example of user interaction data includes search feature data. Search feature data may indicate which one or more search features were viewed, clicked, swiped, or otherwise interacted with for a variety of contexts. A search feature of a set of search results may be associated with curated content. For example, the search feature of a search using a movie name may be a show time listing, a link to a trailer, movie review, or other curated content displayed within search results (as opposed to content that a user has to click-through or otherwise navigate to). For example, prediction module 164 may develop a rule that for a particular context, a movie review was shown or clicked on, movie show times were shown or interacted with, etc. Prediction module 164 may learns to predict which search features a user may want to click or perform a long view on for a given context.

Prediction module 164 may reference the machine-learning model to define a particular context for a computing device that is most relevant to a search query at a particular time. For example, prediction module 164 may refine the context received from context module 162 to isolate a specific subset of the one or more device or user characteristics defined by the context that are most relevant for inferring an intent of a search using a search query, at a particular time. For example, with regards to a search query that is a title of a movie, prediction module 164 may refine a context of computing device 110A that indicates any number of device or user characteristics to instead define a simple context of fewer device or user characteristics that indicate it is a Saturday night, computing device 110A is at a home location, while the weather is raining outside.

Given the refined context, and the search query, prediction module 164 may determine an intent of a search using the search query. Prediction module 164 may determine that the intent is to obtain information to allow a user to perform one or more of the observable actions correlated with the context. For example, with a search query about a movie and a context that indicates it is a Saturday night, computing device 110A is at a home location, and the weather is raining outside, prediction module 164 may determine that the intent of the search is to find movie reviews or other information about the movie that excludes purchasing tickets to go see the movie.

Prediction module 164 may request search module 166 perform a search using a search query. Prediction module 164 may obtain search results from search module 166 returned from the requested search performed based on the search query.

Before sending search results on to computing devices 110, prediction module 164 may adjust (e.g., format, rearrange, re-rank, emphasize, or adjust in another way) the search results according to the intent. Prediction module 164 may adjust search results, based on a predicted intent, so as to automatically emphasize information contained in search results that a user of a computing device and/or users of other computing devices, for similar intents, have needed, in order to complete a task or perform an action.

For example, given previous actions (e.g., searches of certain queries) performed by a user of a computing device and/or other users of other computing devices, prediction module 164 may infer a task or an action the user may need to perform for a particular context. The inferred task or action may be equivalent to an intent. By inferring the task or action, prediction module 164 may determine the type of information that a user may be searching for when executing a search using a particular query.

For example, prediction module 164 may rearrange a ranking of search results, including curated and non-curated content, such that reviews of a movie are ranked higher than ticket purchasing features when the context indicates it is a Saturday night, computing device 110A is at a home location, and it is raining outside. Computing device 110A may receive an indication of the adjusted search results and UI module 120A may cause UIC 112A to present the adjusted search results as part of user interface 114.

In this way, when the adjusted search results are output via a user interface, information that satisfies the intent is output in such a way that a user is able to quickly identify the information that satisfies the intent, from the rest of the search results. In other words, by outputting adjusted search results, prediction module 164 may emphasize the portion of search results that a user is more likely to be searching for at a current time over other search results.

Figure 2:
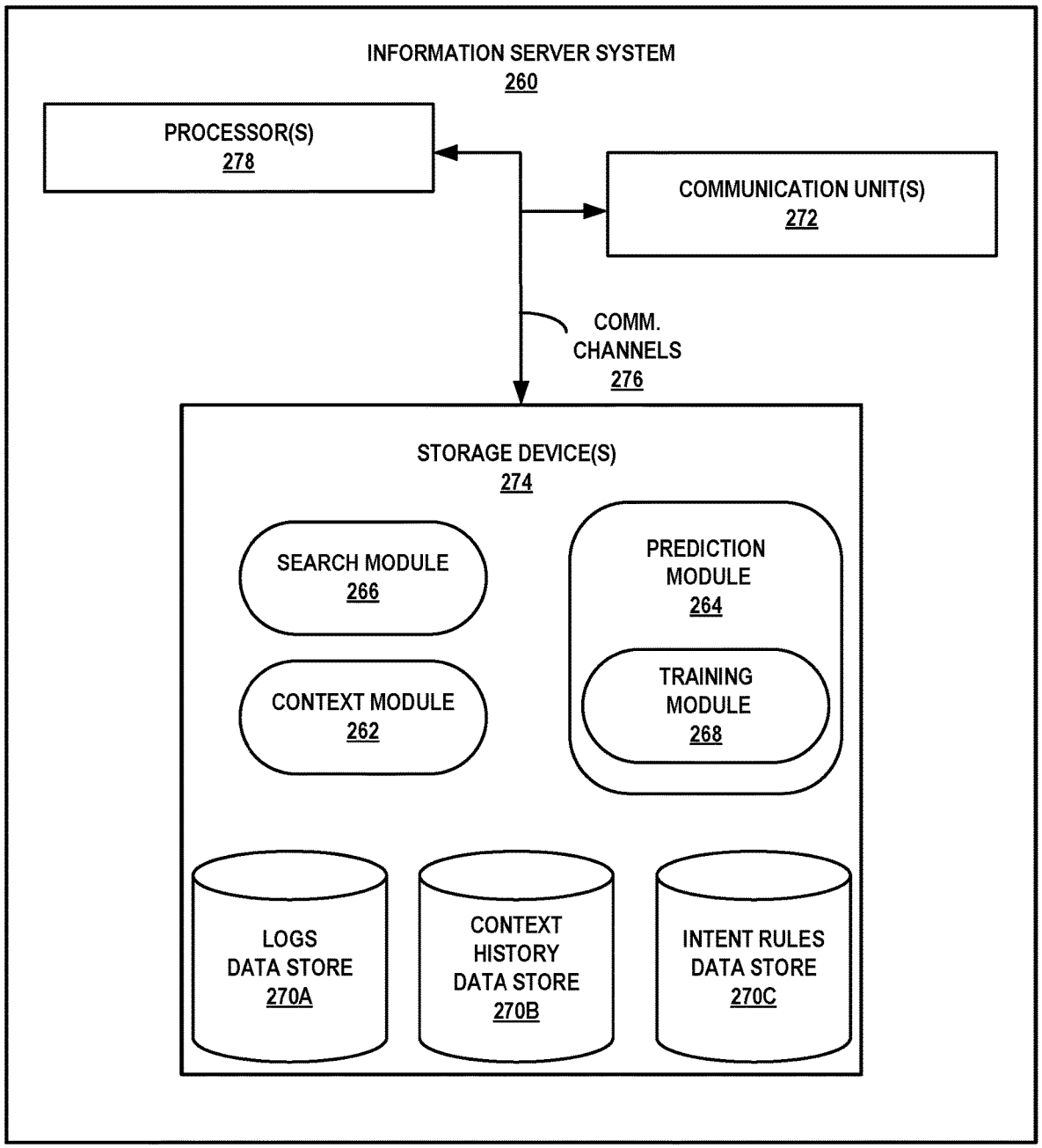
FIG. 2 is a block diagram illustrating an example computing system configured to predict an intent associated with a search query and adjust search results based on the intent, in accordance with one or more aspects of the present disclosure.

FIG. 2 is a block diagram illustrating an example computing system configured to predict an intent associated with a search query and adjust search results based on the intent, in accordance with one or more aspects of the present disclosure. FIG. 2 includes information server system (ISS) 260 as an example of ISS 160 of FIG. 1. ISS 260 is described below within the context of system 100 of FIG. 1. FIG. 2 illustrates only one particular example of ISS 260, and many other examples of ISS 260 may be used in other instances and may include a subset of the components included in example ISS 260 or may include additional components not shown in FIG. 2.

ISS 260 provides computing devices 110 with a conduit through which a computing device, such as computing devices 110A, may execute searches for information related to search queries and in some examples, automatically receive adjusted search results that emphasizes information that ISS 260 predicts will satisfy the intent of a search or the needs of users of computing devices 110, for a particular context. As shown in the example of FIG. 2, ISS 260 includes one or more processors 278, one or more communication units 272, and one or more storage devices 274. Storage devices 274 of ISS 260 include context module 262, prediction module 264, and search module 266. Within prediction module 264, storage devices 74 includes training module 268. Modules 262-266 include at least the same, if not more, capability as, respectively, modules 162-166 of FIG. 1.

Storage devices 274 of ISS 260 further include logs data store 270A, context history data store 270B, and intent rules data store 270C (collectively, "data stores 270"). Communication channels 276 may interconnect each of the components 270, 272, 278, and 274 for inter-component communications (physically, communicatively, and/or operatively). In some examples, communication channels 276 may include a system bus, a network connection, an inter-process communication data structure, or any other method for communicating data.

One or more communication units 272 of ISS 260 may communicate with external computing devices, such as computing devices 110 of FIG. 1, by transmitting and/or receiving network signals on one or more networks, such as network 130 of FIG. 1. For example, ISS 260 may use communication unit 272 to transmit and/or receive radio signals across network 130 to exchange information with computing devices 110. Examples of communication unit 272 include a network interface card (e.g. such as an Ethernet card), an optical transceiver, a radio frequency transceiver, a GPS receiver, or any other type of device that can send and/or receive information. Other examples of communication units 272 may include short wave radios, cellular data radios, wireless Ethernet network radios, as well as universal serial bus (USB) controllers.

One or more storage devices 274 within ISS 260 may store information for processing during operation of ISS 260 (e.g., ISS 206 may store data accessed by modules 262, 264, 266, and 268 during execution at ISS 260). In some examples, storage devices 274 are a temporary memory, meaning that a primary purpose of storage devices 274 is not long-term storage. Storage devices 274 on ISS 260 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 274, in some examples, also include one or more computer-readable storage media. Storage devices 274 may be configured to store larger amounts of information than volatile memory. Storage devices 274 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 274 may store program instructions and/or data associated with modules 262, 264, 266, and 268.

One or more processors 278 may implement functionality and/or execute instructions within ISS 260. For example, processors 278 on ISS 260 may receive and execute instructions stored by storage devices 274 that execute the functionality of modules 262, 264, 266, and 268. These instructions executed by processors 278 may cause ISS 260 to store information, within storage devices 274 during program execution. Processors 278 may execute instructions of modules 262, 264, 266, and 268 to learn and predict an intent of a search using a search query or the informational needs of users of computing devices, for various contexts, given the previous actions of other users of other computing devices, for the same contexts, and automatically provide information that is relevant to the predicted needs of a user of a computing device, for a particular context. That is, modules 262, 264, 266, and 268 may be operable by processors 278 to perform various actions or functions of ISS 270 which are described herein.

Data stores 270 represent any suitable storage medium for storing information related to application usage logs, search feature logs, and rules (e.g., of a machine learning system) for predicting the needs of users of computing devices or the intent of searches for various contexts. The information stored at data stores 270 may be searchable and/or categorized such that one or more modules 262-268 may provide an input requesting information from one or more of data stores 270 and in response to the input, receive information stored at data stores 270.

Before ISS 260 can collect or may make use of information associated with a user being stored at any of data stores 270, the user may be provided with an opportunity to provide input to control whether programs or features of ISS 260 can collect and make use of user information, or to dictate whether and/or how ISS 260 may receive content that may be relevant to the user. In addition, certain data stored by ISS 260 may be treated in one or more ways before it is stored or used by ISS 260, so that personally-identifiable information is removed. Thus, the user may have control over how information is collected about the user and used by ISS 260.

Logs data store 270A may be primarily maintained by search module 266 and context module 262. Log data store 270A may be part of, or separate from, context history data store 270B which is generally maintained by context module 262. Log data store 270A may include one or more searchable data bases or data structures that organize the different types of data logs that are indicative of user inputs received by computing devices 110 from which training module 268 may determine rules for inferring user-initiated actions performed by computing devices 110, for various contexts. Examples of information contained at logs data store 270A includes search log data, application (app) log data, and other data (e.g., a query and user interactions on a map application, a streaming video application, an assistant application, etc.).

Search log data includes information that have been searched by individual computing devices, such as computing devices 110 of FIG. 1 as well as the information returned from searches, and even user interaction data (e.g., views, clicks, etc.) associated with the information returned from searches. For example, log data store 270A may include rows devoted to individual or groups of computing devices 110 and within each row, log data store 270A may include information related to searches that search module 266 executed on behalf of the individual or groups computing devices 110. Examples of search log data include search terms or queries, times of day and/or locations of the computing devices that are associated with the search terms, counts associated with the search terms that indicate how frequently or how often searches of the search terms occurred, an indication of whether a search using a search term was successful (e.g., whether the search result immediately in a subsequent search implying that the search was unsuccessful), the search features presented, whether a user interacted with such a search feature, and any other information related to searches performed by computing devices.

App log data includes organized and searchable, historical user interaction data associated with individual or groups of computing devices, such as computing devices 110, that is organized according to application. The types of application log that may be stored at data store 270A includes, but is not limited to, application name, application type, duration of application execution, whether an application was open, installed, or closed for a particular location context, and any other information that prediction module 264 may need to infer one or more observable actions that are then used to predict an intent of a search using a search query for a particular context.

As indicated above, context history data store 270B may include some or all of log data store 270A. Context history data store 270B includes organized and searchable, historical contextual information associated with individual or groups of computing devices, such as computing devices 110. They types of contextual information that may be stored at context history data store 270B includes, but is not limited to, location information, time of day information, sensor information (e.g., obtained from computing devices 110), user interest information, information about a devices operating state, application execution information (e.g., what and when was the application executed), and any other information that prediction module 264 may need to predict the needs of users and infer an intent of a search using a search query.

Intent rules data store 270C includes one or more previously developed rules that prediction module 264 relies on to predict a task or action likely to be performed by a user of a computing device for a current context as well as information that the user may need to accomplish the task. For example, data store 270C may store rules of a machine learning or artificial intelligence system of prediction module 264. The machine learning or artificial intelligence system of prediction module 264 may access the rules of data store 270C to infer tasks and needs associated with users of computing devices 110 for a particular context.

In some examples, prediction module 264 may provide a current context of a computing device as input to data store 270C and receive as output, an intent or information pertaining to a task or action that a user of the computing device may need to perform in the current context and a broader context (that encompasses the current context). In some examples, the rules of data store 270C may output a degree of likelihood (e.g., a count, a probability, etc.) associated with an intent, task or action for the current context and a similar degree of likelihood associated with the task or action for a broader context. And in some examples, prediction module 264 may provide the predicted task as input to data store 270C and receive as output, information pertaining to the types of information that the user may need in the current context to complete the predicted task.

Training module 268 of prediction module 264 may generate the rules stored at data store 270C for predicting and determining actions being performed by users, and therefore intents, for certain contexts. Training module 268 may generate rules that enable prediction module 264 to define a context that is relevant for inferring intent of a search using a search query. Training module 268 may generate rules that enable prediction module 264 to determine based on an inferred intent, relevant search features to promote or demote when outputting search results returned from a search using a search query in a particular context.

For example, a machine learning or artificial intelligence system of training module 268 may analyze the contextual information obtained by context module 262 and stored at data store 270B and identify correlations between the contextual information and the application usage data and the search feature data stored at data store 270A. Types of machine learning systems used by training module 268 include deep-learning models, Bayesian networks, neural networks, and other types of artificial intelligent models. For example, training module 268 may develop a table with a row for each computing device 110 or group of computing device 110 that share similar contexts, similar application usage data, and/or similar search feature data associated with the similar contexts. Based on the correlations between contextual information and user-initiated actions associated with computing devices 110, training module 268 may develop rules for defining contexts that, if correlated with particular contexts, may indicate a specific intent of a search being performed by computing devices 110 for that particular contexts.

Training module 268 may generate rules that enable prediction module 264 to determine which one or more characteristics of a context are important or related to a search using a search query. Training module 268 may use deep learning on the information stored at logs data store 270A to predict actions and therefore, intents related to queries and contexts.

For example, with regards to application usage data, by correlating the application usage data with contextual information stored at data store 270B, training module 268 may learn in what specific contexts of computing devices 110 that users of computing devices 110 open, close, install, or delete various applications. Depending on the type of application, training module 268 may infer an action being performed or an intent associated with the context. For example, if the application is a news or informational application, training module 268 may infer an informational intent associated with a particular context. If the application is a shopping application or a ticket purchasing application, training module 268 may infer a commercial intent associated with a particular context.

With regards to search features, by correlating the application usage data with contextual information stored at data store 270B, training module 268 may learn in what specific contexts of computing devices 110 that users of computing devices 110 interact, or do not interact, with various curated content on a search page. Depending on the type of search feature, training module 268 may infer an action being performed or an intent associated with the context. For example, if the search feature is an informational feature (e.g., a movie review), training module 268 may infer an informational intent associated with a particular context. If the application is a shopping feature or a ticket purchasing feature or an event time feature, training module 268 may infer a commercial intent associated with a particular context.

Training module 268 may therefore generate more accurate rules at data store 270C that prediction module 264 uses to predict actual probabilities/frequencies of actions occurring than other systems. That is, training module 268 may generate rules that enable prediction module 264 to more easily make comparisons of objective data across various contexts and trigger decisions (e.g., determine intents) for various contexts, as opposed to performing less accurate predicting based on more subjective data (e.g., a data set generated by raters about when a certain feature would be useful).

As such, when adjusting search results, prediction module 264 may use other information, besides a user's past searches, location or query entity type as the only type of contextual information used to determine an intent. Furthermore, adjusted search results that are provided in response to a determining a user's specific contextual intent may be different than results and a ranking thereof, returned by search module 266, without prediction module 264 expressly determining that intent.

Figure 3:
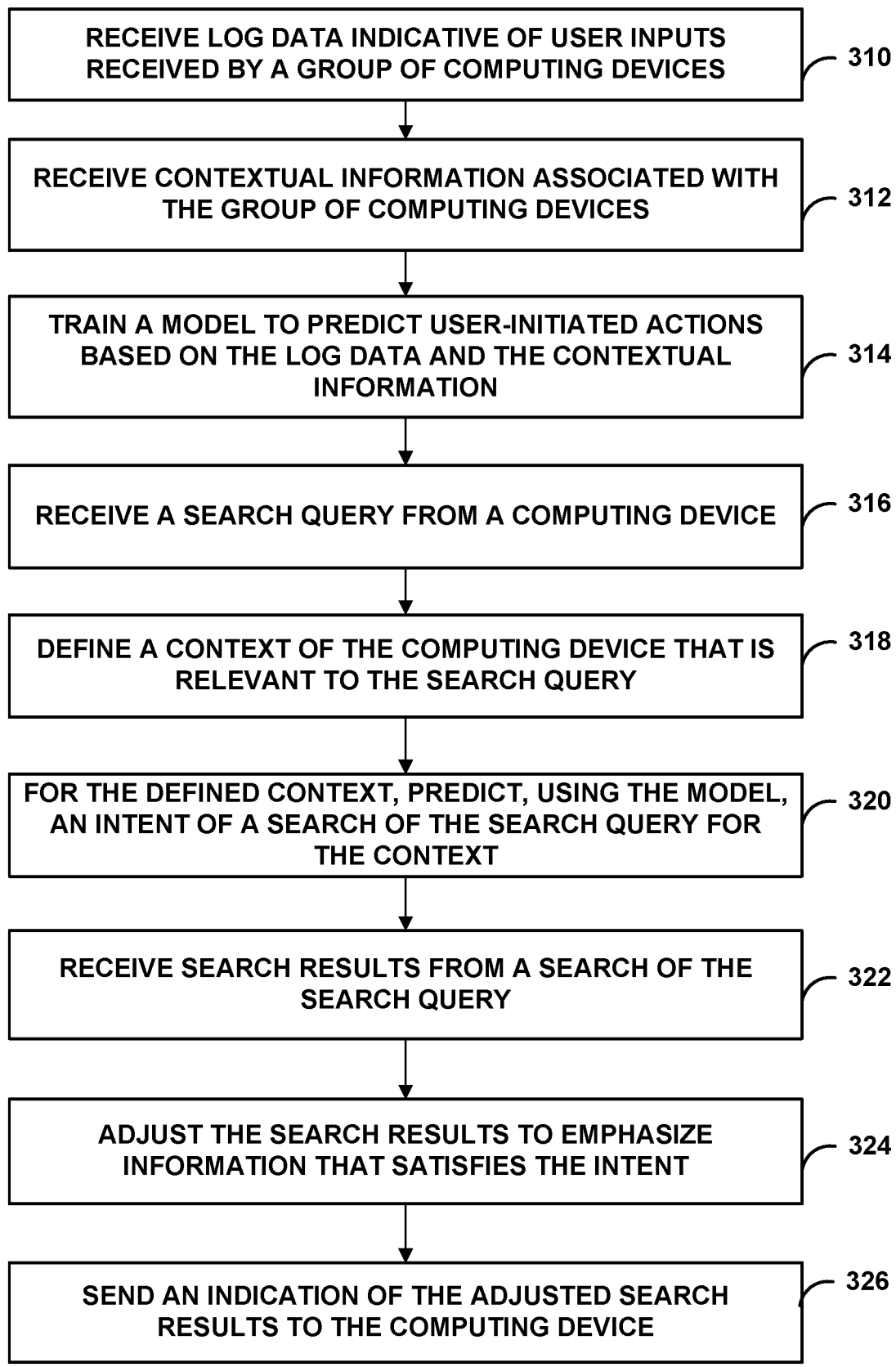
FIG. 3 is a flowchart illustrating example operations performed by an example computing system configured to predict an intent associated with a search query and adjust search results based on the intent, in accordance with one or more aspects of the present disclosure.

FIG. 3 is a flowchart illustrating example operations performed by an example computing system configured to predict an intent associated with a search query and adjust search results based on the intent, in accordance with one or more aspects of the present disclosure. FIG. 3 is described below in the context of system 100 of FIG. 1 and ISS 260 of FIG. 2. For example, ISS 160 and/or ISS 260 may perform operations 310-326 for predicting an intent associated with a search query and adjusting search results based on the intent, in accordance with one or more aspects of the present disclosure. Operations 310-326 may be performed in a different order than that shown in FIG. 3. ISS 160 or 260 may perform the process shown in FIG. 3 using additional or fewer operations than those shown.

As shown in FIG. 3, in operation, ISS 260 may receive log data indicative of user inputs received by a group of computing devices for various contexts (310). For example, users of computing devices 110 may cause respective query modules 122 to send search queries to ISS 260 to execute searches for information. In addition to executing searches of the search queries, search module 266 may store the search queries, and/or results at data store 270A, to generate one or more search histories associated with each of computing devices 110. The search histories may include information about various search features viewed, selected, or ignored when search results were presented via UICs 112 to users of computing devices 110. In addition to executing searches, the users of computing devices 110 may provide inputs to UICs 112 that cause computing devices 110 to execute other types of user-initiated actions (e.g., open applications, close applications, install applications, etc.). Context module 262 may store information about the other user-initiated actions at data store 270A.

ISS 260 may receive contextual information associated with the group of computing devices (312). For example, context module 262 may store information about a current context associated with each of computing devices 110, when each computing device 110 performs a user-initiated action. The context may indicate a location, a time, an orientation, a speed, or any other contextual characteristic that may define a context.

ISS 260 may train a model to predict user-initiated actions based on the log data and the contextual information (314). For example, training module 268 of prediction module 264 may generate rules that enable a deep-learning model to infer user-initiated actions, and therefore intent, for various contexts. Using the contextual information, log data, and other information obtained about computing devices 110, the rules may accurately predict, for a particular context, the most relevant part of the context with regards to a user's search intent. For example, by identifying specific user-initiated actions being performed in specific contexts, that are not also being performed in other contexts, training module 268 may develop a rule that predicts the specific user-initiated action to be performed when a future context of a computing device matches the specific context in which the specific user-initiated actions are being performed.

ISS 260 may receive a search query from a computing device (316). For example, a user of computing device 110A may take a plane to Greece. Upon arrival at an airport in Greece, the user may provide gesture or voice input to UID 112A that represents a search query being input to query module 122A. UI module 120A may send information about the search query to query module 122A which may then forward the query on to search module 266 of ISS 260 for further processing. The search query may include a single character string for the word "Greek".

ISS 260 may define a context of the computing device that is relevant to the search query (318). For example, while contextual module 262 may determine a detailed and broad-scoped context of computing device 110A while the user is inputting "Greek" into UIC 112A as a search query, prediction module 264 may determine a refined context in order to determine more accurate intent of the search query. The model of prediction module 264 may determine unique characteristic defined by the context of computing device 110 that are not common across a large group of device contexts. The model of prediction module 264 may determine user-initiated actions performed by other computing devices 110, when the contexts of the other computing devices 110, shared similar unique characteristics.

For example when at the Greek airport, the context of computing device 110A may indicate a popular social media application is executing at computing device 110A at the current time, the day of the week is Tuesday, the weather is Sunny, the location of computing device 110A is at the airport in Greece, the user recently purchased air plane tickets, the user recently took a flight, the user is texting a contact named "Mother" to send a message that the user arrived safely, etc. Prediction module 264 may refine the context of computing device 110A to highlight unique characteristics which may include an indication that the location of computing device 110A is at the airport in Greece, the user recently purchased air plane tickets, the user recently took a flight.

For the defined context, ISS 260 may predict, using the model, an intent of a search using the search query for the context (320). For example, prediction module 264 may input the defined context of computing device 110A, along with the search query "Greek" into the model and receive as output, an indication that the most likely intent of the search for the specific context is not to find a Greek restaurant as it might be for other contexts, but instead may be to obtain translations of the Greek language.

ISS 260 may receive search results from a search using the search query (322). For example, prediction module 266 may request that search module 266 execute a search for the search query "Greek". In response to the request, prediction module 264 may receive search results (e.g., an indication of a search result page) that includes one or more search features or other search characteristics defined by the search results. That is, the search results received from search module 266 may include portions of curated content (e.g., search features) such as restaurant reviews, restaurant locations, movie reviews, movie locations, weather forecasts, facts about culture, and other curated content. One such piece of curated content may be a translation feature that enables a user to obtain translations from his or her primary language to Greek.

ISS 260 may adjust the search results to emphasize information that satisfies the intent (324). For example, the search results obtained from search module 266 (including the search features described above) may arrive at prediction module 264 in a ranked order. The ranking of the search results may place more popular search features or information higher than other portions of the search results. For example, Greek restaurant recommendations may be a high-ranking search results whereas the translation feature may be a low-ranking search result. Before outputting the indication of the search results to computing device 110A, prediction module 264 may adjust the ranking of the search results so that the translation feature, i.e., the portion of the search results that corresponds to the inferred intent of the search query, is ranked higher or more prominently than other search results, such as the restaurant recommendations.

ISS 160 may send an indication of the adjusted search results to the computing device (326). For example, prediction module 164 may package the adjusted search results as content for presentation at UIC 112A at computing device 110A and transmit the content as data over network 130 to UI module 120A. UI module 120A may configure UIC 112A to present the content (e.g., at a display). When presented at UIC 112A, the portion of the search results associated with the translation feature may appear more prominently that other portions of the search results. For example, the translation feature may appear near an upper portion of a search page of a graphical user interface, the translation feature may have a special color, texture, or font to distinguish the translation feature from other search features and from other content, or may otherwise be emphasized in some other way.

Clause 1. A method comprising: determining, by a computing system, based on user-initiated actions performed by a group of computing devices, an intent of a search using a particular search query received from a computing device; adjusting, based on the intent, at least a particular portion of search results obtained from the search using the search query by emphasizing information that satisfies the intent; and sending, by the computing system, to the computing device, an indication of the adjusted search results.

Clause 2. The method of clause 1, wherein determining the intent of the search of the particular search query comprises: defining, based on the user-initiated actions performed by the group of computing devices, a particular context of the computing device that is relevant to the particular search query, wherein the intent of the search of the particular search query is further determined based on the particular context of the computing device.

Clause 3. The method of any one of clauses 1-2, further comprising: receiving, by the computing system, log data indicative of user inputs received by the group of computing devices; and determining, based on the log data, the user-initiated actions performed by the group of computing devices.

Clause 4. The method of clause 3, wherein the log data includes application usage data for the group of computing devices for a plurality of different contexts.

Clause 5. The method of any one of clauses 3-4, wherein the log data includes search feature data for the group of computing devices for a plurality of different contexts.

Clause 6. The method of any one of clauses 1-5, wherein adjusting the at least a particular portion of search results obtained from the search using the search query by emphasizing information that satisfies the intent comprises increasing a respective ranking of the at least a portion of search results obtained from the search using the search query relative to a respective ranking of other portions of the search results obtained from the search using the search query.

Clause 7. The method of any one of clauses 1-6, wherein: the search results comprise a plurality of search features, each search feature being associated with curated content; the at least a portion of search results comprises a particular search feature from the plurality of search features; and adjusting the at least a particular portion of search results obtained from the search using the search query by emphasizing information that satisfies the intent comprises: identifying, by the computing system, based on the intent, the particular search feature; and increasing a respective ranking of the particular search relative to respective rankings of other search features from the plurality of search features.

Clause 8. A computing system comprising: at least one processor; and a memory comprising instructions that when executed, cause the at least one processor of the computing system to: determine, based on user-initiated actions performed by a group of computing devices, an intent of a search using a particular search query received from a computing device; adjust, based on the intent, at least a particular portion of search results obtained from the search using the search query by emphasizing information that satisfies the intent; and send, by the computing system, to the computing device, an indication of the adjusted search results.

Clause 9. The computing system of clause 8, wherein the instructions are part of a machine-learned model configured to determine the intent based on the user-initiated actions performed by the group of computing devices.

Clause 10. The computing system of any one of clauses 8-9, wherein the machine-learned model is a deep-learning model trained on log data indicative of user inputs received by the group of computing devices.

Clause 12. The computing system of clause 10, wherein the log data includes at least one of application usage data for the group of computing devices for a plurality of different contexts or search feature data for the group of computing devices for the plurality of different contexts.

Clause 13. The computing system of any one of clauses 8-12, wherein the instructions, when executed, cause the at least one processor to determine the intent of the search of the particular search query by at least: defining, based on user-initiated actions performed by the group of computing devices, a particular context of the computing device that is relevant to the particular search query; and determining the intent of the search of the particular search query based further on the particular context.

Clause 14. The computing system of any one of clauses 8-13, wherein the instructions, when executed, cause the at least one processor to adjust the at least a particular portion of search results obtained from the search using the search query by emphasizing information that satisfies the intent by at least increasing a respective ranking of the at least a portion of search results obtained from the search using the search query relative to a respective ranking of other portions of the search results obtained from the search using the search query.

Clause 15. The computing system of any one of clauses 8-14, wherein: the search results comprise a plurality of search features, each search feature being associated with curated content; the at least a portion of search results comprises a particular search feature from the plurality of search features; and the instructions, when executed, cause the at least one processor to adjust the at least a particular portion of search results obtained from the search using the search query by emphasizing information that satisfies the intent by at least: identifying, based on the intent, the particular search feature; and increasing a respective ranking of the particular search relative to respective rankings of other search features from the plurality of search features.

Clause 16. A computer-readable storage medium comprising instructions that, when executed, configure one or more processors of a computing system to: determine, based on user-initiated actions performed by a group of computing devices, an intent of a search using a particular search query received from a computing device; adjust, based on the intent, at least a particular portion of search results obtained from the search using the search query by emphasizing information that satisfies the intent; and send, by the computing system, to the computing device, an indication of the adjusted search results.

Clause 17. The computer-readable storage medium of clause 16, wherein the instructions, when executed, further configure the one or more processors of the computing system to: receive log data indicative of user inputs received by the group of computing devices; and determine, based on the log data, the user-initiated actions performed by the group of computing devices.

Clause 18. The computer-readable storage medium of any one of clauses 16-17, wherein the instructions, when executed, configure the at least one processor to determine the intent of the search of the particular search query by at least: defining, based on user-initiated actions performed by the group of computing devices, a particular context of the computing device that is relevant to the particular search query; and determining the intent of the search of the particular search query based further on the particular context.

Clause 19. The computer-readable storage medium of any one of clauses 16-18, wherein the instructions, when executed, configure the at least one processor to adjust the at least a particular portion of search results obtained from the search using the search query by emphasizing information that satisfies the intent by at least increasing a respective ranking of the at least a portion of search results obtained from the search using the search query relative to a respective ranking of other portions of the search results obtained from the search using the search query.

Clause 20. The computer-readable storage medium of any one of clauses 16-19, wherein: the search results comprise a plurality of search features, each search feature being associated with curated content; the at least a portion of search results comprises a particular search feature from the plurality of search features; and the instructions, when executed, configure the at least one processor to adjust the at least a particular portion of search results obtained from the search using the search query by emphasizing information that satisfies the intent by at least: identifying, based on the intent, the particular search feature; and increasing a respective ranking of the particular search relative to respective rankings of other search features from the plurality of search features.

Clause 21. The computing system of clause 8, comprising means for performing any of the methods of clauses 1-7.

Clause 22. The computer-readable storage medium of clause 15, comprising further instructions that, when executed configure the one or more processors of the computing system of clause 8 to perform any of the methods of clauses 1-8.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable medium may include computer-readable storage media or mediums, which corresponds to a tangible medium such as data storage media, or communication media including any medium that facilitates transfer of a computer program from one place to another, e.g., according to a communication protocol. In this manner, computer-readable medium generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:
1. A method comprising:
receiving, by a computing system, a search query from a computing device of a user, the search query including one or more terms;

obtaining, by the computing system, contextual information associated with the computing device of the user, wherein:
the contextual information is in addition to the one or more terms of the search query,
the contextual information comprises environmental information associated with the computing device, and
the environmental information associated with the computing device indicates characteristics of a physical environment of the computing device;
selecting, by the computing system, a subset of the obtained contextual information that indicates a particular current context associated with the computing device, wherein at least the subset of the obtained contextual information comprises a subset of the environmental information and excludes information from a search history of the user;
determining, by the computing system, an intent of the search query received from the computing device of the user, wherein the intent is a predicted intent that is specific to the search query given the particular current context associated with the computing device, and wherein determining the intent of the search query comprises:
processing the subset of the contextual information that is in addition to the one or more terms of the search query, using a machine learning model that is based on past user-initiated actions performed by a group of computing devices of respective users, to determine the intent, wherein the respective users are in addition to the user of the computing device;
receiving, by the computing system, search results obtained responsive to the one or more terms of the search query; and
subsequent to receiving the search results obtained responsive to the one or more terms of the search query and prior to sending, to the computing device of the user, any indication of the search results:
adjusting, by the computing system, based on the determined intent of the search query, at least a particular portion of the search results obtained responsive to the one or more terms of the search query, wherein adjusting at least the particular portion of the search results comprises promoting at least the particular portion of the search results that satisfy the determined intent of the search query; and
sending, by the computing system, to the computing device of the user, an indication of the adjusted search results.

2. A computing system comprising:
at least one processor; and
a memory comprising instructions that when executed, cause the at least one processor of the computing system to:
receive a search query from a computing device of a user, the search query including one or more terms;
obtain contextual information associated with the computing device of the user, wherein:
the contextual information is in addition to the one or more terms of the search query,
the contextual information comprises environmental information associated with the computing device, and
the environmental information associated with the computing device indicates characteristics of a physical environment of the computing device;
select a subset of the obtained contextual information that indicates a particular current context associated with the computing device, wherein at least the subset of the obtained contextual information comprises a subset of the environmental information and excludes information from a search history of the user;
determine an intent of the search query received from the computing device of the user, wherein the intent is a predicted intent that is specific to the search query given the particular current context associated with the computing device, and wherein in determining the intent of the search query, the instructions cause the at least one processor of the computing system to:
process the subset of the contextual information that is in addition to the one or more terms of the search query, using a rule that is based on past user-initiated actions performed by a group of computing devices of respective users, to determine the intent, wherein the respective users are in addition to the user of the computing device;
receive search results obtained responsive to the one or more terms of the search query; and
subsequent to receiving the search results obtained responsive to the one or more terms of the search query and prior to sending, to the computing device of the user, any indication of the search results:
adjust, based on the determined intent of the search query, at least a particular portion of the search results obtained responsive to the one or more terms of the search query, wherein in adjusting at least the particular portion of the search results, the instructions cause the at least one processor of the computing system to promote at least the particular portion of the search results that satisfy the determined intent of the search query; and
send, by the computing system, to the computing device of the user, an indication of the adjusted search results.

3. A computer-readable storage medium comprising instructions that, when executed, configure one or more processors of a computing system to:
receive a search query from a computing device of a user, the search query including one or more terms;
obtain contextual information associated with the computing device of the user, wherein:
the contextual information is relevant to one or more of the terms of the search query,
the contextual information is in addition to the one or more terms of the search query,
the contextual information comprises environmental information associated with the computing device, and
the environmental information associated with the computing device indicates characteristics of a physical environment of the computing device;
select a subset of the obtained contextual information that indicates a particular current context associated with the computing device, wherein at least the subset of the obtained contextual information comprises a subset of the environmental information and excludes information from a search history of the user;
determine an intent of the search query received from the computing device of the user, wherein the intent is a predicted intent that is specific to the search query given the particular current context associated with the computing device, and wherein in determining the intent of the search query, the instructions cause one or more of the processors of the computing system to:
process the subset of the contextual information that is in addition to the one or more terms of the search query, using a machine learning model that is based on past user-initiated actions performed by a group of computing devices of respective users, to determine the intent, wherein the respective users are in addition to the user of the computing device;
receive search results obtained responsive to the one or more terms of the search query; and
subsequent to receiving the search results obtained responsive to the one or more terms of the search query and prior to sending, to the computing device of the user, any indication of the search results:
adjust, based on the determined intent of the search query, at least a particular portion of the search results obtained responsive to the one or more terms of the search query, wherein in adjusting at least the particular portion of the search results, the instructions cause the at least one processor of the computing system to promote at least the particular portion of the search results that satisfy the determined intent of the search query; and
send, by the computing system, to the computing device of the user, an indication of the adjusted search results.

4. The method of claim 1, wherein selecting the subset of the obtained contextual information that indicates a particular current context associated with the computing device further comprises:
defining, based on the contextual information associated with the computing device of the user and the user-initiated actions performed by the group of computing devices, the particular current context associated with the computing device, wherein the particular current context associated with the computing device is defined based on relevance to the particular search query
wherein the intent of the search query is further determined based on the particular current context associated with the computing device.

5. The method of claim 1, further comprising:
receiving, by the computing system, log data indicative of user inputs received by the group of computing devices; and
determining, based on the log data, the user-initiated actions performed by the group of computing devices.

6. The method of claim 1, wherein:
the search results comprise a plurality of search features, each search feature being associated with curated content;
at least the particular portion of the search results comprises a particular search feature from the plurality of search features; and
adjusting at least the particular portion of the search results obtained responsive to the search query further comprises:
identifying, by the computing system, based on the determined intent of the search query, the particular search feature; and
increasing a respective ranking of the particular search feature relative to respective rankings of other search features from the plurality of search features.

7. The method of claim 1, wherein determining the intent of the search query further comprises:
processing the search query, along with the subset of the contextual information and using the machine learning model, to determine the intent.

8. The method of claim 1, wherein promoting at least the particular portion of the search results that satisfy the determined intent of the search query comprises:
identifying that a first search result and a second search result each satisfy the determined intent of the search query, wherein the first search result and the second search result are responsive to the search query; and
displaying the first search result and the second search result more prominently than other search results, of the search results, based on identifying that the first search result and the second search result each satisfy the determined intent of the search query.

9. The method of claim 1,
wherein the environmental information comprises at least one of: location information of the computing device, movement information of the computing device, weather information for a location of the computing device, a time of day, or a day of week.

10. The computing system of claim 2, wherein the rule is generated by a machine-learned model configured to determine the intent of the search query based on the user-initiated actions performed by the group of computing devices.

11. The computing system of claim 2, wherein in selecting the subset of the obtained contextual information that indicates a particular current context associated with the computing device, the instructions further cause the at least one processor to:
define, based on the contextual information associated with the computing device of the user and the user-initiated actions performed by the group of computing devices, the particular current context associated with the computing device, wherein the particular current context associated with the computing device is defined based on relevance to the particular search query; and
determine the intent of the search query based further on the particular current context associated with the computing device.

12. The computing system of claim 2, wherein:
the search results comprise a plurality of search features, each search feature being associated with curated content;
at least the particular portion of the search results comprises a particular search feature from the plurality of search features; and
in adjusting at least the particular portion of the search results obtained responsive to the search query, the instructions further cause the at least one processor to:
identify, based on the determined intent of the search query, the particular search feature; and
increase a respective ranking of the particular search feature relative to respective rankings of other search features from the plurality of search features.

13. The computer-readable storage medium of claim 3, wherein:
the search results comprise a plurality of search features, each search feature being associated with curated content;
at least the particular portion of the search results comprises a particular search feature from the plurality of search features; and in adjusting at least the particular portion of the responsive to the search query, the instructions further cause the at least one processor to:
   identify, based on the determined intent of the search query, the particular search feature; and
   increase a respective ranking of the particular search feature relative to respective rankings of other search features from the plurality of search features.

14. The computer-readable storage medium of claim 3, wherein the log data includes at least one of application usage data for the group of computing devices for a plurality of different contexts or search feature data for the group of computing devices for the plurality of different contexts.

15. The method of claim 5, wherein the log data includes application usage data for the group of computing devices for a plurality of different contexts.

16. The method of claim 5, wherein the log data includes search feature data for the group of computing devices for a plurality of different contexts.

17. The method of claim 7, wherein the machine learning model is trained to generate scores for a plurality of candidate intents based on processing the contextual information and the search query.

18. The computing system of claim 10, wherein the machine-learned model is a deep-learning model trained on log data indicative of user inputs received by the group of computing devices.

19. The method of claim 17, wherein determining the intent of the search query further comprises:
   selecting, based on the scores for the plurality of candidate intents, the intent from among the plurality of candidate intents.

20. The computing system of claim 18, wherein the log data includes at least one of application usage data for the group of computing devices for a plurality of different contexts or search feature data for the group of computing devices for the plurality of different contexts.

* * * * *